United States Patent [19]
Adachi

[11] Patent Number: 5,617,489
[45] Date of Patent: Apr. 1, 1997

[54] OPTICAL ADAPTIVE THRESHOLDER FOR CONVERTING ANALOG SIGNALS TO BINARY SIGNALS

[75] Inventor: Richard S. Adachi, 1641 Mariposa St., Richmond, Calif. 94804

[73] Assignee: Richard S. Adachi, Richmond, Calif.

[21] Appl. No.: 998,803

[22] Filed: Aug. 4, 1993

[51] Int. Cl.$^6$ .............. H04N 1/40; H03M 1/12; G06K 9/40; H01L 27/00
[52] U.S. Cl. .......... 382/275; 382/255; 358/445; 358/465; 358/448; 348/572; 250/208.1; 250/578.1
[58] Field of Search .................. 358/443, 445, 358/465, 466, 448, 468; 382/270, 272, 273, 255, 275; 348/572, 573, 574; 250/208.1, 578.1

[56] References Cited

U.S. PATENT DOCUMENTS

| | | | |
|---|---|---|---|
| 2,855,513 | 9/1955 | Hamburgen et al. | 382/272 |
| 3,484,747 | 8/1969 | Nunley | 382/272 |
| 3,534,334 | 6/1970 | Bartz et al. | 382/272 |
| 3,778,768 | 12/1973 | Brisk et al. | 382/270 |
| 3,911,212 | 5/1975 | Yoshizawa et al. | 382/272 |
| 3,944,977 | 3/1976 | Holmes et al. | 382/272 |
| 3,965,290 | 6/1976 | Tisue | 358/466 |
| 4,012,715 | 1/1977 | Essenmacher | 382/272 |
| 4,109,211 | 2/1978 | Mese et al. | 382/272 |
| 4,230,265 | 10/1980 | Casaly | 382/270 |
| 4,351,004 | 9/1982 | Choate et al. | 382/270 |
| 4,442,544 | 4/1984 | Moreland et al. | 382/270 |
| 4,468,704 | 8/1984 | Stoffel et al. | 382/272 |
| 4,525,747 | 5/1985 | Sakai | 358/282 |
| 4,566,125 | 1/1986 | Clunn | 382/270 |
| 4,593,325 | 6/1986 | Kannapell et al. | 382/270 |
| 4,597,009 | 3/1986 | Ballmer et al. | 382/272 |
| 4,644,410 | 12/1987 | Schlictig | 382/272 |
| 4,850,029 | 7/1989 | Moyer et al. | 382/270 |
| 4,908,875 | 3/1990 | Assael et al. | 382/270 |
| 5,313,533 | 5/1994 | Scott | 382/270 |

OTHER PUBLICATIONS

"Digital Document Processing" by Hseih S. Hou.

*Primary Examiner*—Edward L. Coles, Sr.
*Assistant Examiner*—Kimberly A. Williams

[57] ABSTRACT

An adaptive threshold for converting an analog video signal to a binary video signal. This video system employs two identical array sensors. These sensors are operated synchronously and each has its own lens. The lens of the primary array sensor is focused for a sharp image. The analog output of this primary array sensor is the primary video signal. A secondary array sensor is implemented with its lens intentionally set to some degree of defocus. This degree of defocus defines the adaptive threshold function, independent of the primary video. The analog output of this secondary array sensor is the adaptive threshold signal.

2 Claims, 2 Drawing Sheets

OPTICAL ADAPTIVE THRESHOLDER FOR CONVERTING ANALOG SIGNALS TO BINARY SIGNALS

BACKGROUND

1. Field of Invention

This invention relates to document scanners and converting their analog video signals to binary video signals.

2. Background of Prior Art

In the field of document scanning and image processing, the output of linear array scanners are analog video signals. These analog video signals represent continuously varying shades of gray. One objective is to convert these analog video signals to binary video signals by comparing a thresholding signal with the analog video signal on a pixel by pixel basis. The generation of the thresholding signal is critical if an accurate binary video representation of printed document is desired. Generally, an aperture or window is electrically synthesized from the primary video signal. Several scan lines are synchronously stored until the aperture is filled. The aperture makes available a matrix of pixels in the local vicinity of and including the pixel of interest. A function such as median[AR], weighted average[AR], or local peak/valley[AK] operates on the matrix of pixels and generates a threshold level for a given pixel. The next pixel of interest will have an aperture with a different matrix of pixels and so on. Most threshold functions are adaptive in that each threshold level is calculated from its aperture on a pixel by pixel basis. The aperture can be of one dimension(1D) or two dimension(2D) and any number of pixels in either dimension. When linear CCD's are used as scanners, one dimensional aperture synthesis generally requires some sort of delay lines or temporary storage of data and additional circuitry. When a two-dimensional aperture synthesis system is employed, several scans of data must be stored as well and then synchronously made available as required by the aperture. Complexity and quantity of electronic circuitry is proportional to any increase of the aperture in either dimension.

SUMMARY OF INVENTION

It is an object of this invention to generate a binary video image of a document by an optically synthesized local adaptive threshold on a pixel by pixel basis.

A benefit of this invention is a decrease in electronic circuitry and its associated advantages in manufacturing and maintenance.

Another benefit of this invention is a higher frequency of operation for a given power consumption.

Another benefit of this invention is ease of changing aperture size.

DESCRIPTIONS OF DRAWINGS

FIG. 1 describes an overview of the two CCD scanner system.

FIG. 2 shows a comparison of the primary video waveform and the 2D adaptive threshold waveform. The output of the voltage comparator is the binary representation on a pixel by pixel basis.

REFERENCE NUMERALS IN DRAWINGS

1 Test document
2 Illumination
3 Video Lens (focused)
4 Thresh. Lens (defocused)
5 CCD scanner (primary)
6 CCD scanner (adp. thrsh)
7 Control Logic & Timing
8 Odd pixels (adp. thrsh)
9 Even Pixels (adp. thrsh)
10 Odd pixels (primary)
11 Even pixels (primary)
12 Gain amplifier
13 Offset amplifier
14 Gain amplifier
15 Offset amplifier
16 Odd pixels (adp. thrsh)
17 Even pixels (adp. thrsh)
18 Odd pixels (primary)
19 Even Pixels (primary)
20 Sample/Hold Multiplexor
21 Sample/Hold Multiplexor
22 Capacitor
23 Capacitor
24 FET buffer
25 FET buffer
26 Adaptive thresh. signal
27 Primary video signal
28 Voltage Comparator
29 Binary video signal

DESCRIPTION OF THE PREFERRED EMBODIMENT

Figure 1:
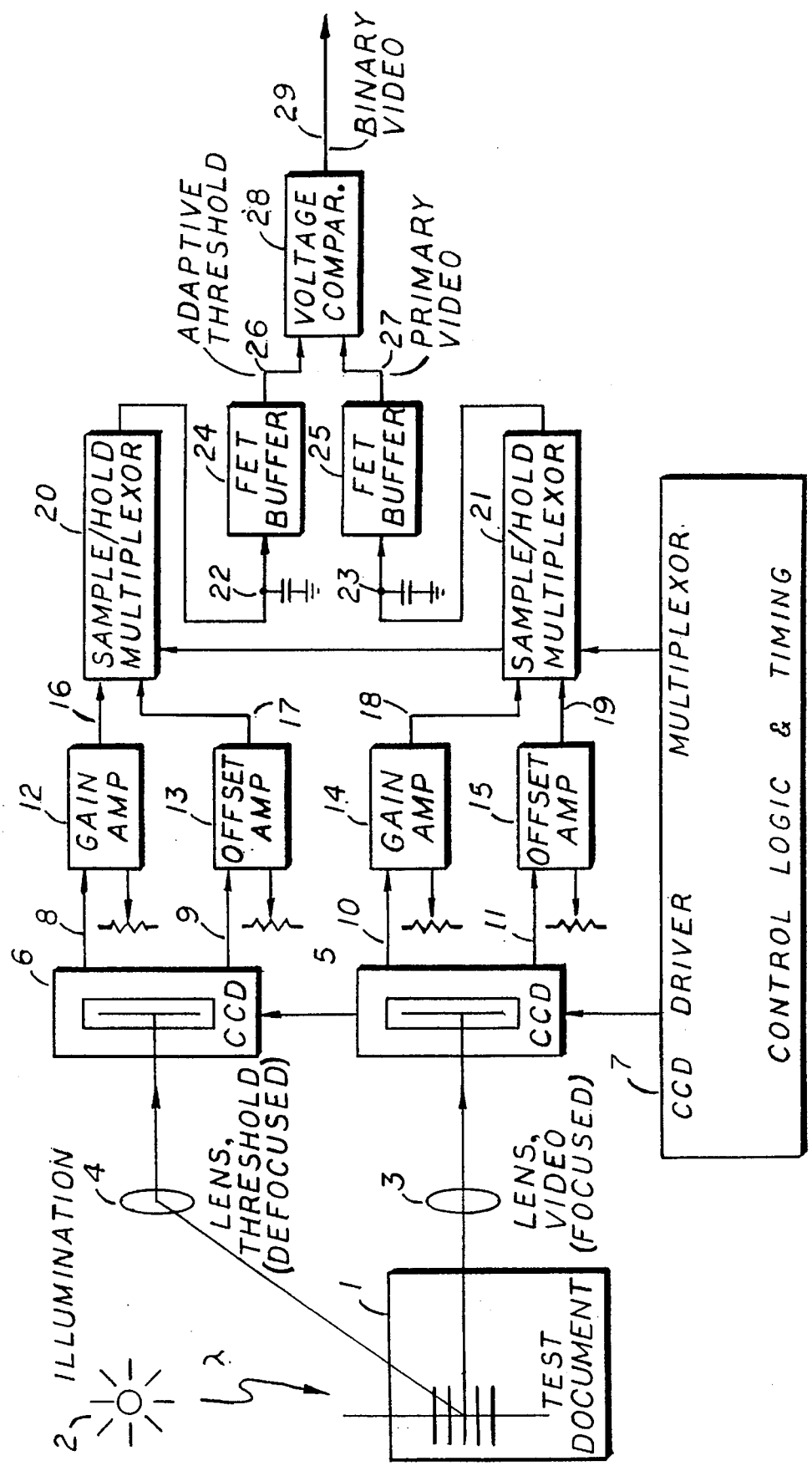
Figure 2:
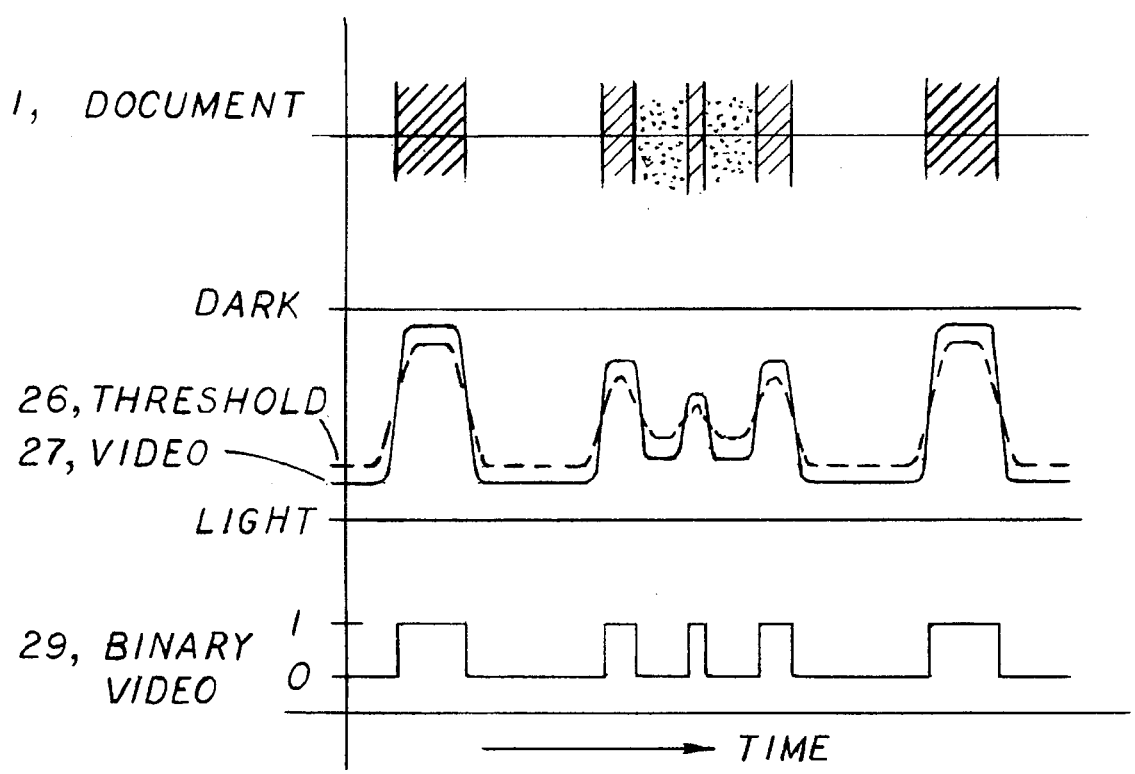

FIG. 1 shows a paper document 1, illumination 2, lenses 3 and 4, and the two identical CCD scanners 5 and 6, both synchronously scanning precisely the same line of the document 1. Note that 3 and 5 are on the optical axis while 4 and 6 are slightly off axis. CCD scanner 5 generates the primary video waveform through a finely focused lens 3. CCD scanner 6 optically synthesizes the adaptive threshold waveform through a defocused lens 4. The degree of defocusing determines the lack of contrast and consequently the size of the effective synthesized aperture. A more finely focused lens results in a smaller synthesized aperture. Conversely, a coarsely focused lens results in a larger synthesized aperture. The main point here is that, since the defocused light through 4 onto 6 contains all the information for a synthesized aperture, the equivalent electronic circuitry in prior art, such as median[AR] or weighted average [AR] can now be omitted. Each scanner 5 and 6 is a linear CCD with two analog video outputs 8 and 9 or 10 and 11. One output of a scanner can be considered even numbered pixels and the other output odd numbered pixels. The odd and even pixels must be multiplexed or interlaced in the proper sequence by the video multiplexors 20 and 21 to represent the original features on the document. The two outputs are bufferred with gain and offset amplifiers 12, 13, 14, 15 to facilitate matching the two signals 16 and 17 or 18 and 19. Signals 16 and 17 are multiplexed by 20. Signals 18 and 19 are multiplexed by The multiplexors, 20 and 21 are equivalent to sample and hold circuits, which store their signals on capacitors 22 and 23. FET input buffers 24 and 25 are used to transfer the signals to the inputs of comparator 28. Comparator 28 compares the adaptive threshhold signal 26 with the primary video signal 27. The output 29 of the comparator is a binary representation of this comparison on a pixel by pixel basis.

What is claimed is:

1. An apparatus for an optical adaptive thresholder for converting an analog primary video signal to a binary video signal, pixel by pixel in real time comprising:

first scanning means, having a finely focused lens and a first CCD scanner, scanning on an optical axis, line by line, a document, said first scanning means outputting odd and even video pixel signals, via said finely focused lens;

second scanning means, having a defocused lens and a second CCD scanner, scanning slightly off said optical axis in synchronization with said first scanning means, line by line, said document, said second scanning means outputting odd and even threshold pixel signals via said defocused lens;

illumination means illuminating said document scanned by said first and second scanning means;

first normalizing means for normalizing and matching said odd and even video pixel signals;

second normalizing means for normalizing and matching said odd and even threshold pixel signals;

first sample and hold means for alternately multiplexing said odd and even video pixel signals, output from said first normalizing means, to compose said primary video signal;

second sample and hold means for alternately multiplexing said odd and even threshold pixel signals, output from said second normalizing means, to compose an adaptive threshold signal; and comparing means, for comparing said primary video signal with said adaptive threshold signal to generate said binary video signal.

2. An apparatus for an optical adaptive thresholder as in claim 1, wherein the first and second normalizing means are each a pair of offset and gain amplifiers.

* * * * *